United States Patent
Le Pelerin

(10) Patent No.: US 9,215,505 B2
(45) Date of Patent: Dec. 15, 2015

(54) METHOD AND SYSTEM FOR SECURE PROCESSING A STREAM OF ENCRYPTED DIGITAL AUDIO/VIDEO DATA

(71) Applicant: NAGRAVISION S.A., Cheseaux-sur-Lausanne (CH)

(72) Inventor: Alain Le Pelerin, Renens (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 50 days.

(21) Appl. No.: 14/271,865

(22) Filed: May 7, 2014

(65) Prior Publication Data
US 2014/0373042 A1    Dec. 18, 2014

(30) Foreign Application Priority Data
May 7, 2013    (EP) .................................... 13166771

(51) Int. Cl.
| | |
|---|---|
| *H04N 7/167* | (2011.01) |
| *H04N 21/4627* | (2011.01) |
| *H04N 21/418* | (2011.01) |
| *H04N 21/439* | (2011.01) |
| *H04N 21/4405* | (2011.01) |
| *H04N 21/4623* | (2011.01) |

(Continued)

(52) U.S. Cl.
CPC ....... *H04N 21/4627* (2013.01); *H04N 21/4181* (2013.01); *H04N 21/439* (2013.01); *H04N 21/4348* (2013.01); *H04N 21/4353* (2013.01); *H04N 21/4405* (2013.01); *H04N 21/4623* (2013.01)

(58) Field of Classification Search
CPC ...................................................... H04N 7/167
See application file for complete search history.

(56) References Cited

U.S. PATENT DOCUMENTS

| | | | |
|---|---|---|---|
| 5,029,207 | A | 7/1991 | Gammie |
| 5,689,565 | A | 11/1997 | Spies et al. |

(Continued)

FOREIGN PATENT DOCUMENTS

| | | |
|---|---|---|
| EP | 1 078 524 | 11/1999 |
| EP | 1 421 789 | 12/2002 |

(Continued)

OTHER PUBLICATIONS

European Search Report issued in EP 13 16 6771 dated Sep. 12, 2013.

(Continued)

*Primary Examiner* — Hunter B Lonsberry
(74) *Attorney, Agent, or Firm* — DLA Piper LLP US

(57) ABSTRACT

Method and system to prevent control words sharing. The system comprises a receiver capable of processing a digital data stream. The receiver, having a video descrambler device, is coupled to a primary and secondary secure device. The digital data stream comprises video content data scrambled by a first algorithm using a control word, audio content data encrypted with a secret second algorithm using a system key, and encrypted control messages comprising the control word. The primary secure device decrypts the control message and obtains the control word. The video descrambler device uses this control word to descramble the video content data. The secondary secure device comprises a decryption device which decrypts the encrypted audio content data and a watermarking module configured to add a watermark to the decrypted audio content data and return watermarked decrypted audio content data to the receiver.

24 Claims, 2 Drawing Sheets

(51) Int. Cl.
*H04N 21/434* (2011.01)
*H04N 21/435* (2011.01)

(56) References Cited

U.S. PATENT DOCUMENTS

| | | |
|---|---|---|
| 6,904,522 B1 | 6/2005 | Benardeau et al. |
| 6,973,022 B1 | 12/2005 | Machida et al. |
| 7,043,020 B2 | 5/2006 | Maillard et al. |
| RE39,166 E | 7/2006 | Gammie |
| 7,552,457 B2 | 6/2009 | Van De Ven et al. |
| 7,684,567 B2 | 3/2010 | Maillard et al. |
| 7,720,351 B2 | 5/2010 | Levitan |
| 2002/0126844 A1 | 9/2002 | Rix et al. |
| 2004/0098603 A1 | 5/2004 | Corinne |
| 2005/0055551 A1 | 3/2005 | Becker et al. |
| 2006/0083371 A1 | 4/2006 | Duval et al. |
| 2006/0109982 A1 | 5/2006 | Puiatti et al. |
| 2006/0117392 A1 | 6/2006 | Courtin et al. |
| 2006/0123246 A1 | 6/2006 | Vantalon et al. |
| 2007/0169173 A1 | 7/2007 | Brown et al. |
| 2007/0223695 A1 | 9/2007 | Beun et al. |
| 2007/0250912 A1 | 10/2007 | Rassool et al. |
| 2007/0253551 A1 | 11/2007 | Guillot et al. |
| 2007/0286422 A1 | 12/2007 | Cocchi et al. |
| 2008/0080711 A1 | 4/2008 | Gagnon et al. |
| 2008/0298585 A1 | 12/2008 | Maillard et al. |
| 2009/0007240 A1 | 1/2009 | Vantalon et al. |
| 2009/0028328 A1 | 1/2009 | Munsell et al. |
| 2009/0254996 A1 | 10/2009 | Conus et al. |
| 2010/0024043 A1 | 1/2010 | Neau |
| 2010/0169664 A1 | 7/2010 | Danois et al. |
| 2010/0183149 A1 | 7/2010 | Candelore |
| 2010/0299528 A1 | 11/2010 | Le Floch |
| 2011/0058509 A1 | 3/2011 | Wei |
| 2011/0075843 A1 | 3/2011 | Gremaud et al. |
| 2011/0099364 A1 | 4/2011 | Robyr et al. |
| 2011/0154042 A1 | 6/2011 | Gremaud et al. |
| 2011/0238991 A1 | 9/2011 | Schipper |
| 2012/0008781 A1 | 1/2012 | Chevallier et al. |
| 2012/0060034 A1 | 3/2012 | Hutchings et al. |

FOREIGN PATENT DOCUMENTS

| | | |
|---|---|---|
| EP | 1 485 857 | 6/2003 |
| EP | 1 523 188 | 4/2005 |
| EP | 1 575 293 | 9/2005 |
| EP | 1 703 731 | 9/2006 |
| EP | 2 337 347 | 6/2011 |
| EP | 2 373 019 | 10/2011 |
| FR | 2 871 017 | 12/2005 |
| WO | WO 99/57901 | 11/1999 |
| WO | WO 00/13412 | 3/2000 |
| WO | WO 02/102704 | 12/2002 |
| WO | WO 03/050750 | 6/2003 |
| WO | WO 2006/040482 | 4/2006 |
| WO | WO 2009/068519 | 6/2009 |
| WO | WO 2009/144264 | 12/2009 |
| WO | WO 2012/022712 | 2/2012 |

OTHER PUBLICATIONS

Hamidreza Shirazi et al., "A Cooperative Cellular and Broadcast Conditional Access System for Pay-TV Systems", IEEE Transactions on Broadcasting, vol. 56, No. 1, pp. 44-57, Mar. 2010.

Yvo G. Desmedt, "Threshold Cryptography", 100 European Transactions on Telecommunications and Related Technologies, vol. 5, No. 4, Jul.-Aug. 1994, pp. 35-43.

English language abstract of FR 2 871 017, published Dec. 2, 2005.

English language abstract of EP 1 703 731, published Sep. 20, 2006.

METHOD AND SYSTEM FOR SECURE PROCESSING A STREAM OF ENCRYPTED DIGITAL AUDIO/VIDEO DATA

CROSS-REFERENCE TO RELATED APPLICATIONS

This application claims the benefit of European Application No. 13166771.9 filed May 7, 2013.

FIELD OF THE INVENTION

Embodiments of the invention relate to a method and a system for processing encrypted audio/video digital data in a stream together with control messages. The method and system are applied in particular in the field of Pay-TV.

TECHNICAL BACKGROUND

According to a method well-known in the Pay-TV field, the audio/video data of a broadcast stream is encrypted by a provider by means of encryption keys called control words. This data is transmitted to user units or set top boxes connected to a display or television set. The control words are transmitted to these user units via a stream of control messages often in parallel of the audio/video data stream, each control message comprising at least one control word.

The user units are generally made up of processing units capable to decode the received audio/video data stream by using a security module designed to be to same extent tamper-proof, and securely configured to perform cryptographic operations related to the processing of the audio/video data.

A security module may take several distinct forms: a first form includes a microprocessor card, a smart card, or more generally an electronic module (in the form of a key, a badge, a dongle, etc. . . . ). This type of security module is generally removable and can be connected to the user unit via electrical contacts and/or a contactless connection interface, for example of ISO 14443 type or NFC type (Near Field Connection) or the like.

A further known form is an integrated circuit placed, often in a irremovable way, in the user unit. An embodiment could comprise a circuit welded on a printed circuit board or a circuit plugged in a connector, such as for example a SIM module connector or the like.

According to a further embodiment, the security module may be integrated into an integrated circuit having also other functions, for example in a descrambling module or in the main microprocessor of a set top box.

In a further embodiment, the security module is not implemented in a particular hardware module, but rather its functionalities are integrated in the form of software only.

When a user unit receives a stream containing the control messages, user access rights are verified by comparing rights stored in the security module with rights contained in the control messages. A successful verification enables extraction of the control word from the control message allowing decryption of the audio video content data. As known, each control word generally allows decryption of a small part of the broadcast encrypted data. Typically, one control word allows decrypting 10 seconds of a Pay-TV program. This time duration, called a cryptoperiod, defines a period after which the control word changes for security reasons.

One notorious method to share with other users an access to encrypted data without being authorized consists of using a genuine user unit, with a real security module, to receive and distribute control words to a set of other non validated or unauthorized user units. This distribution may be performed, for example, via a server or a specific device sometimes called a splitter. When this type of piracy, known sometimes as control word sharing, is implemented, the price related to the access rights acquisition is paid by only a single unit while the audio video content is accessible by several more unauthorized user units.

Document EP1575293A1 describes a method intended to prevent a security module from being shared by several users. According to this method, the security module comprises a memory for storing control message sequences and means for analyzing an abnormal command message sequence by comparison with the stored control messages. When an abnormal sequence is detected, an error counter is incremented. A time delay in the processing of the control words is introduced according to the value of the error counter. The abnormal behavior is defined on the basis of the analysis of the used channels. As for example, if the channel identifier varies alternatively from A to B, the analysis means interprets such a behavior as an abnormal sequence related to security module sharing. The error counter is then incremented. On the contrary, when the channel identifier is A for several cryptoperiods, then passes to B for several further cryptoperiods, the analysis means will not consider this behavior as abnormal and the error counter will not be incremented.

Document U.S. Pat. No. 7,552,457B2 discloses also a method to prevent fraudulent use of control words wherein each time a multimedia unit receives a control message, the unit, or the associated security module, determines to which channel this control message is related. The channel identifiers are stored together with a time information. The messages are compared in order to determine if they are related to different channels or to the same channel. If they are related to different channels, a counter is incremented by a given value. If the control messages are related to the same channel, the counter is decremented. If the counter reaches a predetermined threshold value, this means that many channel changes have occurred and control words decrypting is stopped.

The processes described in the documents EP1575293A1 and U.S. Pat. No. 7,552,457B2 imply that an identifier of the channel concerned for each control message is necessary. Certain configurations do not require the channel identifier, in particular by using the control messages as defined in the Eurocrypt N° EN 50094 standard of December 1992, it is possible to identify a class of channels rather than each individual channel. In this case, the above described processes do not allow blocking the use of several multimedia units operating with only one security module and a splitter.

As is well-known, control messages are typically repeated according to very short time intervals, for example 50 ms. The aim of this is to make the control word necessary for access to the contents rapidly available when channel changing or zapping. When a user unit has received a control message, it typically filters the identical messages in such a way that the control messages are only forwarded to the security module once. A difficulty arises when the control messages contain more than one control word. In practice, two control words are often sent per control message. The advantage of the approach used in the typical systems described lies in the fact that while one of the control words is used, the other is decrypted and memorized. This scheme thus allows using safer decrypting algorithms.

In such a case, it is possible for a fraudulent user to use only one control message of two, then to transmit the unused message to another user unit or processing device. In this way, each user unit receives all the required control words. Therefore, several processing units can allow access to encrypted content while in theory only one subscriber is authorized. This type of fraud is particularly difficult to detect since it is impossible, without using a channel identifier, to distinguish a normal use of all control messages by only one user unit from fraudulent use by two different user units of one control message.

SUMMARY OF THE INVENTION

An object of the embodiment disclosed herein is to prevent, decrease or deter control words sharing piracy, in which content is stolen by extracting the control words from a processing unit and making them available to other non-paying users via Internet for example. These users benefit thus from clear control words for descrambling audio/video data by connecting their processing unit to the Internet.

This object is achieved by a method for processing a digital data stream comprising video content data scrambled with a first algorithm using at least one control word, audio content data encrypted with a secret second algorithm using a system key and said digital data stream further comprising encrypted control messages comprising at least one of the control words, the digital data stream input by a receiver comprising a video descrambler device, the receiver being coupled to a primary secure device and a secondary secure device, the method comprising the steps of:

extracting by the receiver a control message from the digital data stream, transmitting to the primary secure device the extracted control message, the primary secure device decrypts the control message, obtains the control word from the control message and transmits the control word to the receiver, descrambling the video content data with the first algorithm by using the control word, transmitting to the secondary secure device the encrypted audio content data, the secondary secure device decrypts the audio content data with the secret second algorithm by using the system key, the secret algorithm and the system key being previously implemented in the secondary secure device, adds a watermark on the decrypted audio content data and returns watermarked decrypted audio content data to the receiver, and outputting by the receiver the descrambled video content data and the watermarked decrypted audio content data to a display device.

A further object of the embodiments disclosed herein consists of a system for processing a digital data stream, the system comprising a receiver having a video descrambler device, the receiver being coupled to a primary secure device and a secondary secure device, the digital data stream comprising video content data scrambled with a first algorithm using a control word, audio content data encrypted with a secret second algorithm using a system key and related encrypted control messages comprising the control word, the system being characterized in that the receiver is configured to receive the digital data stream and to extract a control message from said digital data stream, and to transmit to the primary secure device the extracted control message, the primary secure device is configured to decrypt the control message and to obtain the control word from the control message, and to transmit the control word to the video descrambler device of the receiver, and the secondary secure device being configured to receive the encrypted audio content data from the receiver and comprises a decryption device configured to decrypt the audio content data with the secret second algorithm by using the system key previously implemented in the secondary secure device and a watermarking module configured to add a watermark to the decrypted audio content data and to return the watermarked decrypted audio content data to the receiver, the receiver being further configured to output to a display device the descrambled video content data and the watermarked decrypted audio content data provided by the secondary secure device.

According to a preferred embodiment, the video data descrambling by the control word and the decryption of the audio data are conditioned by the availability of the suitable user rights stored in the primary second device and/or in the secondary secure device. In this embodiment, rights verification is performed initially before the primary secure device obtains the control word and additionally before the secondary secure device decrypts the audio data.

Due to the particular non-standard secret encryption of the audio content data; sharing control words for video content data decryption without corresponding audio content data becomes a less interesting piracy alternative. In fact, because it remains very difficult for a user to get the suitable audio content data from an alternative source and to synchronize this audio data with illegally obtained video data without errors, the systems and methods discussed are believed to be efficacious. Furthermore, the watermarking of the audio data allows tracking the origin of these data when redistribution of the decrypted audio data taken from the output of the secondary secure device occurs.

In order to protect the watermarked audio data at the output of the secondary secure device, the watermarked audio data may be re-encrypted by the secondary secure device with a key specific to the receiver which will decrypt the re-encrypted watermarked audio data before outputting to the display device.

BRIEF DESCRIPTION OF THE FIGURES

The embodiments disclosed herein will be better understood from the following detailed description, which refers to the attached figures given as non-limiting examples.

DETAILED DESCRIPTION OF THE INVENTION

The receiver STB of the system may take several forms such as a set top box connected to a television set or other display, a hardware and software module integrated in the television set, a home gateway (with or without transcoding or display capabilities), a personal computer, a smartphone, a tablet, or any other apparatus capable of receiving a digital audio/video content data stream ST for processing and displaying to a user. The receiver STB is configured to decrypt audio/video data from streams provided by one or more sources, such as a terrestrial transmitter, a satellite, an internet server, a cable network or a wireless network, etc.

Figure 1:
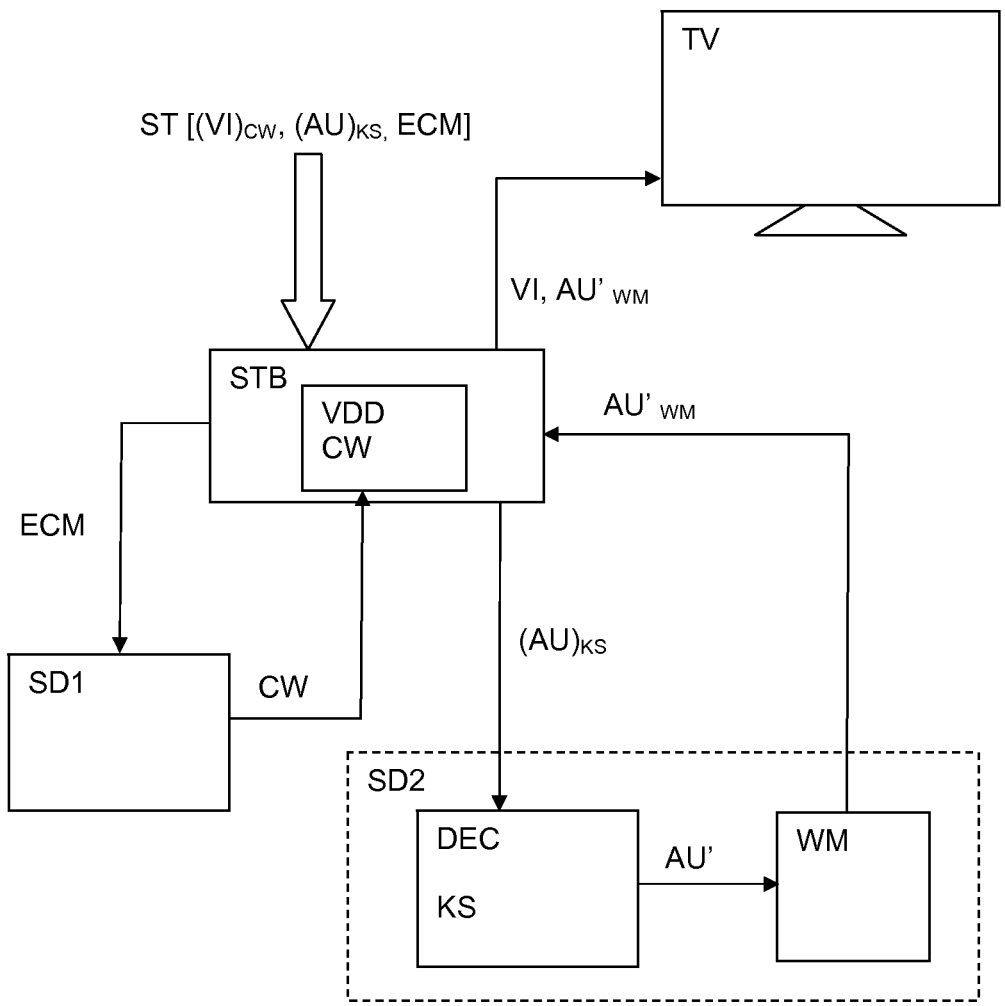
FIG. 1 shows a block diagram of an embodiment disclosed herein comprising a receiver coupled to a primary and a secondary secure device. The primary secure device contributes to video content data descrambling while the secondary secure device decrypts the audio content data by using a secret system key and algorithm before adding a watermark to the audio content data.

In FIG. 1, a receiver STB is coupled, for example locally connected to a primary and secondary secure device (SD1, SD2) which may also take different forms such as a removable electronic module like a smartcard, a key, a badge, a dongle, etc, a fixed integrated circuit welded on the mother board of the receiver, a module integrated into a circuit having other functions (main processor, descrambler etc.) or implemented in software (embedded for example, in receiver's firmware). The secure devices (SD1, SD2) may each have a different form or both have a same form and located at different places or at a same place in relation to the receiver STB.

For example, a single physical device may be plugged into the receiver, such as a CAM (Conditional Access Module), which in this example can support two smartcards, a descrambler module and memories. The CAM module may include a standardized removable housing including card readers and a connector compatible with an interface of the receiver. Document WO2012/022712A1 describes a typical CAM module having a reader for credit card shaped cards, a reader for SIM card shaped cards, a slot for a SD memory card and a descrambler module implemented on a printed circuit board located inside the CAM module.

As illustrated by FIG. 1, a digital data stream ST, comprising scrambled video content data $(VI)_{CW}$, audio content data $(AU)_{KS}$ encrypted with a system key KS and control messages ECM, generally encrypted with a transport key known by the primary secure device SD1, is input by the receiver STB. According to an embodiment, the digital data stream ST may be provided, via a bidirectional network or Internet, by a server as for example by a VOD (Video On Demand) server or a television program replay server (catch up TV).

The receiver STB forwards the control message ECM to the primary secure device SD1, which decrypts it with the transport key before extracting the control word CW necessary for descrambling the video content data $(VI)_{CW}$. According to a preferred configuration, the control word CW is extracted from the control message ECM only after successful verification of access rights by the secure device SD1.

A control message ECM, comprises, in addition to the control word CW, access conditions appearing in general in the form of rights necessary for the user to access one or more audio/video data streams which may be broadcast streams. These rights consist of codes, which indicate a subscription, an authorization for accessing an event or broadcast program content or a validity period for the access, etc. In a preferred embodiment, the primary secure device SD1 operates with a software piece CAK (Conditional Access Kernel) configured to verify the access conditions received from the control message ECM by using an access rights database stored in a memory of the receiver STB or according to an embodiment in a memory of the primary secure device SD1. The access conditions are thus compared with the access rights retrieved from the rights database. Once this verification is successfully executed, (i.e., the stored rights match with the received access conditions), the control word CW is decrypted and released by the primary secure device SD1, which transmits it to the video descrambler device VDD of the receiver STB.

In parallel to descrambling the video content data VI with the control word CW and the first algorithm A1, the receiver STB forwards the encrypted audio content data $(AU)_{KS}$ to the secondary secure device SD2. Contrary to the video content data VI, the audio content data AU is encrypted with a secret system key KS by using a non-standard algorithm or a specific secret algorithm A2 known only by the secondary secure device SD2. Unlike the control word CW and the first algorithm A1, the system key KS and the algorithm A2 are qualified as secret (i.e., they do not belong to any standard and are not described in public documents).

A decryption module DEC decrypts the audio content data AU to obtain decrypted audio data AU', which will be forwarded to a watermarking module WM that adds a watermark to the audio data AU' before transmitting them to the receiver STB.

Watermarking is a technique used to tag protected content in order to detect unauthorized use or illegal copies of the protected content. The watermarking technique consists of embedding a digital mark into the content. The mark may be transmitted according to a visible or an invisible mode. This digital mark could be a unique value or a generic symbol depending on what the content owner or the operator wants to monitor. In the illustrated embodiment, the mark is transmitted in an invisible manner (i.e., in an inaudible mode) and preferably contains at least an identifier specific to the system producing the watermark. For example, the watermark includes a unique identifier of the secondary secure device SD2 and/or of the receiver STB allowing efficient tracking illegal copies of audio/video content.

As obtaining the control word CW is preferably performed under the condition the access rights have been successfully verified, the decryption of the audio content data AU may also be performed only after a successful verification of the access rights by the secondary secure device SD2. In this case, the access conditions extracted from the control message ECM are forwarded by the receiver with the encrypted audio content data $(AU)_{KS}$ to the secondary secure device SD2. The verification is made by the secondary secure device SD2 in a similar way than by the primary secure device SD1 by comparing the access conditions with rights retrieved from the rights database stored in a memory of the receiver STB or of the secondary secure device SD2.

The access conditions extracted from the control message ECM may be verified by the primary secure device SD1 only or by both the primary and the secondary secure device (SD1, SD2).

The primary and the secondary secure device (SD1, SD2) may be of different type or technology so that access conditions verified with the rights of the primary secure device SD1 are not compatible with the rights of the secondary secure device SD2. In this case the control message ECM may contain distinct access conditions, one for the video content data VI and one for the audio content data AU.

According to an embodiment, the receiver STB may convert the access conditions extracted from the control message ECM, which are acceptable by the primary secure device SD1 into a format acceptable by the secondary secure device SD2.

The system key KS for decrypting the audio content data AU may be provided to the secondary secure device SD2 by several ways such as, for example:

a) By control messages ECM transmitted in the input digital data stream ST. Instead of control words CW, some control messages ECM may contain the system key KS or necessary information for generating the system key KS by the secondary secure device SD2. This information may include an address of a memory of the secondary secure device SD2 where the system key KS is located or instructions for a key generator program installed in the secondary secure device SD2 or any other suitable parameters allowing the calculating of the system key KS.

These particular control messages, ignored by the primary secure device SD1, can be processed only by the secondary secure device SD2 for obtaining the system key KS. According to an embodiment, a same control message ECM may contain the control word CW and the system key KS or the information for generating the system key. In this case the control message ECM is forwarded by the receiver to both secures devices SD1 and SD2 for extracting respectively the control word CW and the system key KS.

Information or parameters concerning the second secret decryption algorithm A2 may also be included in the control message ECM such as for example a reference allowing the secondary secure device SD2 selecting the suitable secret algorithm A2 among a set of algorithms pre-stored in a memory of the secondary secure device SD2.

b) By management messages EMM transmitted in the input digital data stream ST and forwarded by the receiver STB to the primary and the secondary secure device (SD1, SD2) foreseen to update the access rights. Regarding the secondary secure device SD2, the management message EMM may provide, in addition to rights updates, the system key KS or necessary information for generating this system key KS by the secondary secure device SD2. Information or parameters concerning the second secret decryption algorithm A2 may also be included in the management message EMM such as, for example, a reference allowing the secondary secure device SD2 selecting the suitable secret algorithm A2 among a set of pre-stored algorithms.

c) The system key KS and the second secret decryption algorithm A2 may be embedded in the secondary secure device SD2 at manufacturing of the device SD2 during a personalization phase. In this case the system key KS and the second secret decryption algorithm A2 remain the same until a change of the secondary device SD2, for example, when the user of the receiver changes the operator or service provider.

Figure 2:
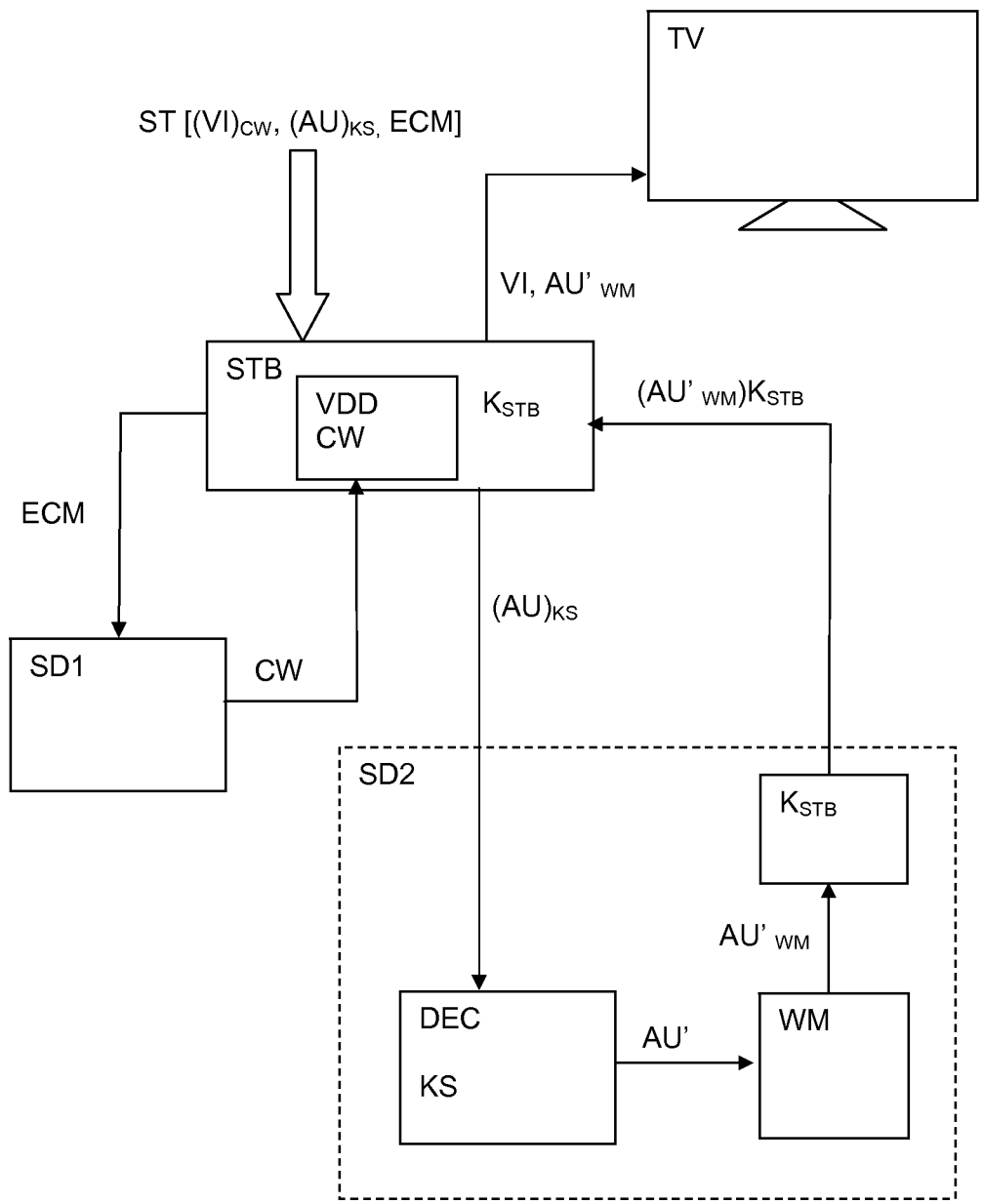
FIG. 2 shows a block diagram of an embodiment of the system illustrated by FIG. 1 where the watermarked audio content data is re-encrypted by the secondary secure device with a key specific to the receiver. The re-encrypted watermarked audio content data is decrypted by the receiver before outputting to a display device.

According to a further embodiment represented by FIG. 2, the watermarked decrypted audio content data $AU'_{WM}$ are re-encrypted by the secondary secure device SD2 with a unique key $K_{STB}$ and an algorithm known only by a given receiver STB. Accordingly, the security of the audio content data AU is reinforced by limiting normal operations' re-distribution of the watermarked decrypted audio content data $AU'_{WM}$ to other receivers.

The unique key $K_{STB}$ may be determined based on identifiers of the secondary secure device SD2 and of the receiver STB during first connection of the receiver STB to the secondary secure device SD2 where the key $K_{STB}$ stored either in a memory of the receiver STB or in a memory of the secondary secure device SD2 is mutually exchanged. Once the key $K_{STB}$ is stored at both the receiver and secure device side, the watermarked decrypted audio content data $AU'_{WM}$ provided by the secure device SD2 is re-encrypted, cf. pairing process described in patent EP1078524B1.

The invention claimed is:

1. A method for processing a digital data stream comprising video content data scrambled by a first algorithm using at least one control word, and audio content data encrypted by a second algorithm using a system key, said digital data stream further comprising encrypted control messages containing the at least one control word, the digital data stream being input by a receiver comprising a video descrambler device, the receiver being coupled to a primary secure device and a secondary secure device, the method comprising the steps of:

extracting by the receiver a control message from the digital data stream;

transmitting to the primary secure device the extracted control message;

receiving a decrypted control word by the receiver from the secondary secure device;

descrambling the video content data using the first algorithm and the control word;

transmitting to the secondary secure device the encrypted audio content data;

receiving the watermarked decrypted audio content data by the receiver from the secondary secure device; and outputting by the receiver the descrambled video content data and the watermarked decrypted audio content data to a display device.

2. The method according to claim 1 wherein the control message further comprises access conditions, the primary secure device verifies the access conditions received from the control message by comparing the access conditions with access rights retrieved from an access rights database stored in a memory of the receiver or in a memory of the primary secure device, the control word being obtained after a successful verification of the access conditions.

3. The method according to claim 2, wherein the secondary secure device verifies the access conditions forwarded by the receiver by comparing the access conditions with access rights retrieved from an access rights database stored in a memory of the receiver or in a memory of the secondary secure device, the encrypted audio content data being decrypted after a successful verification of the access conditions.

4. The method according to claim 3, wherein the control message comprises distinct access conditions for the video content data and for the audio content data.

5. The method according to claim 3, wherein the receiver converts the access conditions received from the control message into a format acceptable by the secondary secure device before forwarding to the secondary secure device.

6. The method according to claim 1, wherein the digital data stream comprises control messages containing the system key or necessary information for generating the system key by the secondary secure device, the control messages, ignored by the primary secure device, being processed only by the secondary secure device for obtaining the system key.

7. The method according to claim 1, wherein the digital data stream comprises control messages containing the control word and the system key or information for generating the system key, the control messages being forwarded by the receiver to both the primary and secondary secure devices for extracting respectively the control word and the system key.

8. The method according to claim 1, wherein the digital data stream comprises management messages providing, in addition to rights updates, the system key to the secondary secure device or necessary information for generating the system key, and information or parameters concerning the second decryption algorithm.

9. The method according to claim 1, wherein the system key and the second decryption algorithm are embedded in the secondary secure device at manufacturing of said secondary secure device during a personalization phase.

10. The method according to claim 1, wherein the watermarked decrypted audio content data is re-encrypted by the secondary secure device with a unique key and algorithm known only by a given receiver, the re-encrypted watermarked decrypted audio content data being returned to the receiver by the secondary secure device.

11. The method according to claim 10, wherein the unique key is determined based on identifiers of the secondary secure device and of the receiver during a first connection of the receiver to the secondary secure device, the key being stored either in a memory of the receiver or in a memory of the secondary secure device and being mutually exchanged.

12. A system for processing a digital data stream, the system comprising:

a receiver having a video descrambler device, the receiver being coupled to a primary secure device and to a secondary secure device, the digital data stream comprising video content data scrambled by a first algorithm using a control word, audio content data encrypted by a second algorithm using a system key and related encrypted control messages comprising the control word, wherein:

the receiver is configured to receive the digital data stream, extract a control message from said digital data stream, and transmit to the primary secure device the extracted control message;

the primary secure device is configured to decrypt the control message, obtain the control word from the control message, and transmit the control word to the video descrambler device of the receiver;

the secondary secure device is configured to receive the encrypted audio content data from the receiver and comprises a decryption device configured to decrypt the audio content data using the second algorithm and the system key previously implemented in the secondary secure device, and a watermarking module configured to add a watermark to the decrypted audio content data and return the watermarked decrypted audio content data to the receiver;

the receiver being further configured to output to a display device the descrambled video content data and the watermarked decrypted audio content data provided by the secondary secure device.

13. The system according to claim 12, wherein the control message further comprises access conditions, the primary secure device is further configured to verify the access conditions received from the control message by comparing the access conditions with access rights retrieved from an access rights database stored in a memory of the receiver or in a memory of the primary secure device, the control word being obtained after a successful verification of the access conditions.

14. The system according to claim 13, wherein the secondary secure device is further configured to verify the access conditions forwarded by the receiver by comparing the access conditions with access rights retrieved from an access rights database stored in a memory of the receiver or in a memory of the secondary secure device, the encrypted audio content data being decrypted after a successful verification of the access conditions.

15. The system according to claim 14, wherein the control message comprises distinct access conditions for the video content data and for the audio content data.

16. The system according to claim 14, wherein the receiver comprises a converter configured to convert the access conditions received from the control message into a format acceptable by the secondary secure device.

17. The system according to claim 12, wherein the digital data stream comprises control messages containing the system key or information for generating the system key by the secondary secure device, the secondary secure device being further configured to process the control messages for obtaining the system key, the primary secure device ignoring the control messages.

18. The system according to claim 12, wherein the digital data stream comprises control messages containing the control word and the system key or information for generating the system key, the receiver being configured to forward the control messages to both the primary and secondary secure devices for extracting respectively the control word and the system key.

19. The system according to claim 12, wherein the digital data stream comprises management messages providing, in addition to rights updates, the system key to the secondary secure device or information for generating the system key, and information or parameters concerning the second decryption algorithm.

20. The system according to claim 12, wherein the system key and the second decryption algorithm are embedded in the secondary secure device at manufacturing of said secondary secure device during a personalization phase.

21. The system according to claim 12, wherein the secondary secure device is further configured to re-encrypt the watermarked decrypted audio content data with a unique key and algorithm known only by a given receiver, and to return the re-encrypted watermarked decrypted audio content data to the receiver, the unique key being based on identifiers of the secondary secure device and of the receiver and stored in a memory of the receiver and in a memory of the secondary secure device.

22. The system according to claim 12, wherein the primary and the secondary secure device are smartcards implemented on a single physical security device locally connected to the receiver.

23. A conditional access module configured to be locally connected to a receiver, the receiver being configured to receive a digital data stream comprising video content data scrambled by a first algorithm using a control word, audio content data encrypted by a second algorithm using a system key and related encrypted control messages comprising the control word, and to extract a control message from said digital data stream, the conditional access module comprising:

a primary secure device configured to decrypt the control message, obtain the control word from the control message, and to transmit the control word to a video descrambler device included in the receiver; and a secondary secure device configured to receive the encrypted audio content data from the receiver, the secondary secure device comprising a decryption device configured to decrypt the audio content data with the second algorithm by using the system key and a watermarking module configured to add a watermark to the decrypted audio content data and to return the watermarked decrypted audio content data to the receiver, the receiver being further configured to output to a display device the descrambled video content data and the watermarked decrypted audio content data.

24. The conditional access module according to claim 23, wherein the primary secure device and the secondary secure device are each implemented as a smartcard inserted in said conditional access module.

* * * * *